United States Patent

Collicutt

[11] Patent Number: 5,372,002
[45] Date of Patent: Dec. 13, 1994

[54] PORTABLE SEED STRIPPER APPARATUS

[75] Inventor: Douglas R. Collicutt, Winnipeg, Canada

[73] Assignee: Hoechst Nor-Am Agrevo Inc., Saskatchewan, Canada; a part interest

[21] Appl. No.: 913,456

[22] Filed: Jul. 15, 1992

[51] Int. Cl.$^5$ .......................................... A01D 45/30
[52] U.S. Cl. ........................................ 56/128; 56/130; 56/199; 56/239
[58] Field of Search ............... 56/126, 128, 130, 198, 56/199, 239

[56] References Cited

U.S. PATENT DOCUMENTS

| 283,415 | 8/1883 | Passmore | 56/199 |
|---|---|---|---|
| 351,791 | 11/1886 | Paxson | 56/198 |
| 426,882 | 4/1890 | Thompson | 56/198 |
| 661,081 | 11/1900 | Sellstrom | 56/198 X |
| 2,670,486 | 3/1954 | Daniell | 56/199 X |
| 2,723,494 | 11/1955 | Parker et al. | 56/128 X |
| 2,727,264 | 12/1955 | Dunham | 56/199 X |
| 2,776,533 | 1/1957 | Yacoby | 56/198 X |
| 2,848,862 | 8/1958 | Harrigan | 56/199 |
| 2,853,845 | 9/1958 | Smith | 56/128 |
| 2,939,717 | 6/1960 | Parker et al. | 56/199 X |
| 3,017,735 | 1/1962 | Jordan et al. | 56/128 |
| 3,119,136 | 1/1964 | Newsom | 56/199 X |
| 3,423,916 | 1/1969 | Teal | 56/199 |
| 4,373,322 | 2/1983 | Beisel | 56/130 X |
| 4,722,139 | 2/1988 | Mahler | 56/202 X |
| 4,738,087 | 4/1988 | Lundahl | 56/130 |
| 4,780,992 | 11/1988 | McKervey | |
| 4,815,261 | 3/1989 | Anderson | 56/128 X |

FOREIGN PATENT DOCUMENTS

| 150189 | 2/1953 | Australia | 56/128 |
|---|---|---|---|
| 483025 | 7/1953 | Italy | 56/128 |
| 270787 | 5/1927 | United Kingdom | 56/199 |
| 500675 | 2/1939 | United Kingdom | 56/199 |

Primary Examiner—Mark Rosenbaum
Assistant Examiner—Frances Han
Attorney, Agent, or Firm—Hoffman, Wasson & Gitler

[57] ABSTRACT

A hand-held apparatus is disclosed for collecting seeds from plants. The apparatus has an elongated handle with a rotary brush-like unit rotatably attached to one end of the handle. The rotary unit has a plurality of seed stripper elements extending radially outwardly from and operatively spaced around the unit. Drive means are provided for rotating the unit and seed containment means are attached to the handle and extend adjacent the unit for catching seed which is stripped off the plants by the seed stripper elements. A conventional string trimmer may be converted into a seed stripper of the invention by removing the string trimmer head and replacing it with the rotary unit of the invention.

5 Claims, 2 Drawing Sheets

PORTABLE SEED STRIPPER APPARATUS

TECHNICAL FIELD

This invention relates to seed collecting apparatus for harvesting seed from grasses or other plants.

BACKGROUND OF THE INVENTION

In the art of reaping seeds from wild grasses or plants, there is a need for portable hand-held seed harvesting apparatus. Wild grasses and plants are often located in difficult to access or ecologically sensitive areas. Hand-held seed harvesting apparatus are portable, do little damage to harvesting sites, and are effective for selective harvesting from intermixed wild plant varieties.

Mahler (U.S. Pat. No. 4,722,139) discloses a hand-held plant clipping collector apparatus comprising a rotatable monofilament line or string trimmer rotatably attached to an elongated handle. A containment means is attached to the cutting end of the portable string trimmer handle and provides an open-ended entrance for cut seed and clippings. The containment means has an open back with a cutting collector in the form of a cloth bag or sack. However, the Mahler apparatus is relatively inefficient since use of a single string for trimming provides limited coverage, and is therefore relatively inefficient. Further, the apparatus is generally adapted to be used with the handle held generally vertically, and is relatively awkward for use in collecting clippings from the top of tall grasses or plants.

SUMMARY OF THE INVENTION

It is an object of the invention to provide an efficient hand-held portable seed collecting apparatus. Thus, according to one aspect of the invention, a hand-held seed collecting apparatus is provided comprising, (a) an elongated handle; (b) a rotary brush like unit rotatably attached to one end of the handle having a plurality of seed stripper elements extending radially outwardly from and operatively spaced around the unit periphery along its axis of rotation; (c) drive means for rotating the unit; and (d) seed containment means attached to the handle and extending adjacent the unit.

According to a further aspect of the invention, there is provided a conversion assembly for use in combination with a string trimmer body of the type having an elongated handle, a drive shaft mounted for rotation within the handle, a motor mounted on the handle for rotating the drive shaft, and a drive shaft connector element at the end of said drive shaft, said conversion assembly comprising, (a) a rotary brush-like unit adapted to be mounted on the drive shaft connector element for rotation therewith, the unit having a plurality of seed stripper elements extending radially outwardly from and operatively spaced around the unit periphery along its axis of rotation; and (b) seed containment means adapted to be removably attached to the handle and extend adjacent the brush.

It is possible to convert a string trimmer of known configuration into a seed collecting apparatus of the invention. Many commercially available string trimmers, such as the "Weed-eater" * by Beaird-Poulan/Weed-eater, division Emerson Electric Co. or the "Eager Beaver"*, by McCulloch Corporation, may be utilized.
*Trade-mark In most commercial string trimmers, a drive shaft in the handle has a connector element attached to it for mating with a connector element on the cutting head of the string trimmer. For the purposes of this invention, the cutting head and protective shield of the string trimmer must be removed. Then, the rotary brush-like unit of the invention may be attached to the connecting member for rotation therewith, by any suitable means. Similarly, the containment member of the invention may be attached to the handle by any suitable means.

BRIEF DESCRIPTION OF THE DRAWINGS

One embodiment of the invention will now be described, by way of example, with reference to the accompanying drawings in which.

DESCRIPTION OF A PREFERRED EMBODIMENT

Figure 1:
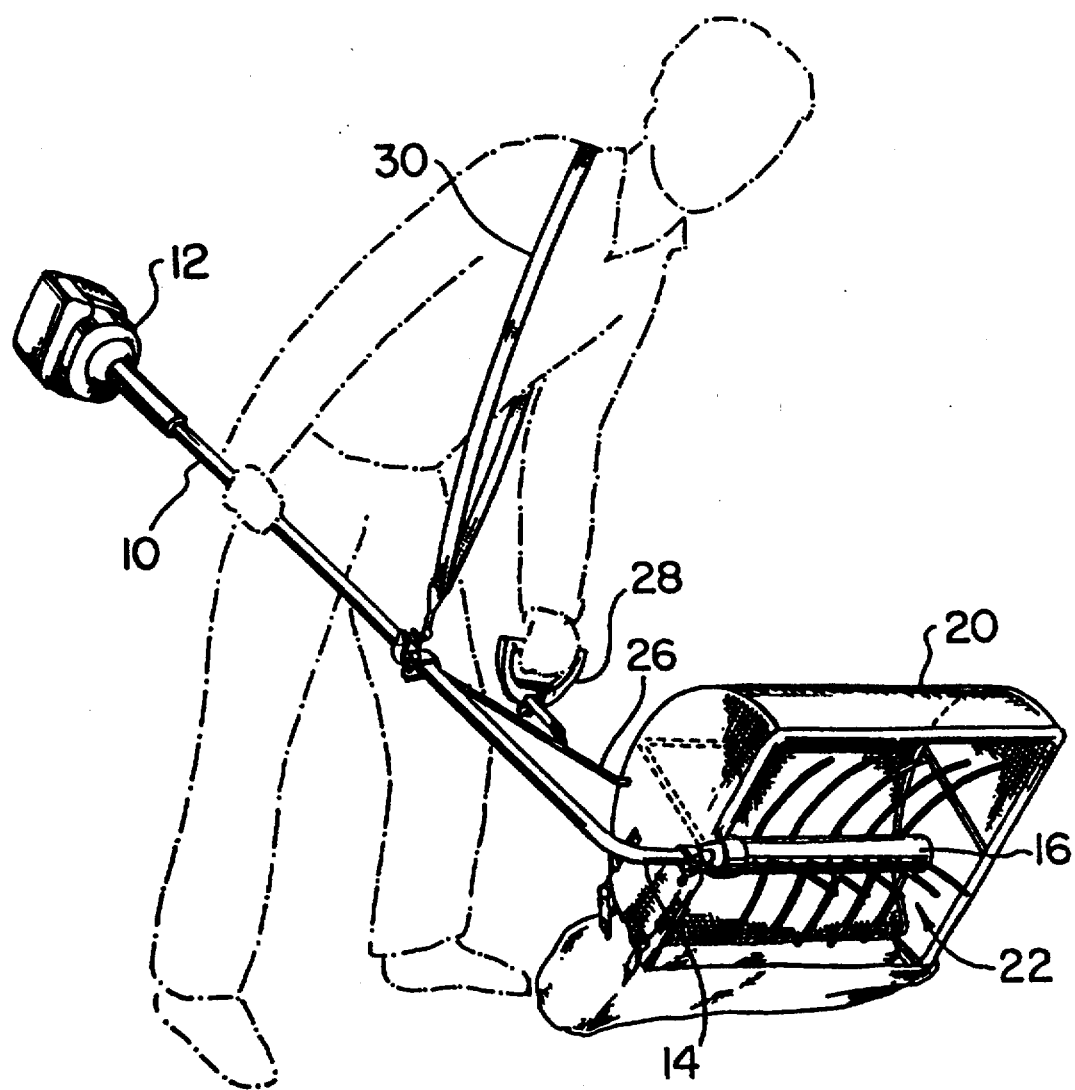
FIG. 1 shows a perspective view of the apparatus.

With reference to FIG. 1, the apparatus generally includes a hollow elongated handle 10 with a gasoline driven motor 12 mounted on one end thereof. A drive shaft (not shown) is mounted for rotation in the handle. The drive shaft is engaged with and extends from the motor 12 to an end 14 of the handle 10. Thus far the apparatus resembles a known string trimmer. A rotary brush-like unit 16 is attached to a connector element on the drive shaft 18 as described below (see FIG. 2). Containment means 20 are mounted near the end 14 of the handle 10 and extend outward adjacent the unit 16 such that the unit 16 is generally centered in an opening 22 of the containment means. A brace 26 extends between the containment means 20 and the handle 10 to provide stability. A hand grip 28 and shoulder strap 30 are mounted on the handle in conventional fashion to facilitate transportation and operation of the apparatus. Alternatively, the hand grip 28 may be mounted on the brace 26 as shown in FIG. 1.

Figure 2:
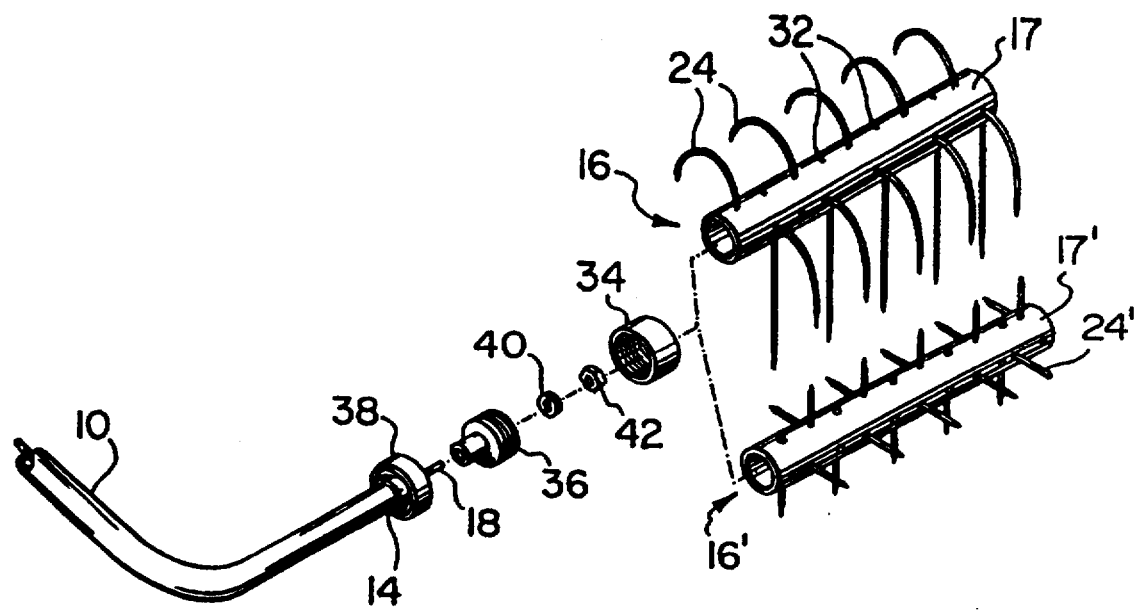
FIG. 2 shows an exploded perspective view of the attachment means used for attaching the unit to the drive shaft.

Referring to FIG. 2, one embodiment of the rotary unit 16 comprises an elongated two inch pvc pipe 17 with a plurality of apertures 32 spaced around its periphery and along its length. Seed stripper elements 24 of suitable material are threaded through each aperture with one end operatively engaged therewith. For instance, the stripper elements may be 60 pound test monofilament line threaded through the apertures and knotted on the end inside the pipe 17. Preferably, the line extends approximately 7 inches radially outwardly of the tube.

A unit 16 with monofilament stripper elements 24 will be sufficient for collecting seeds which are readily dislodged from the plant. However, with certain plants, the seed heads are held tightly onto the plant and the seeds are not easily dislodged. When harvesting that type of plant, an alternate rotary unit 16' may be utilized. In that case, the pipe 17' may be 1" ABS tubing with a plurality of apertures. Elongated, non-flexible stripper elements 24' such as drywall screws, may be inserted transversely through the pipe 17' and a pair of apertures therein, and engaged in the apertures with at least one free end of each member extending radially outwardly of the tube.

One means for quickly and interchangeably attaching the rotary unit which forms an element of the invention to the connector element of the drive shaft of a string trimmer is shown in FIG. 2. In the embodiment shown, a plastic pipe coupling 34 is pressure fit and/or glued onto the plastic pipe 17 of the rotary unit 16. A metal or plastic end pipe cap 36 has a bore hole through which a connector element passes. The connector element comprises a collar 38 rotatably attached to the drive shaft (not shown), and a bolt 18 integral with the collar extending outwardly from the handle 10. A washer 40 and nut 42 engage bolt 18 to hold the end pipe cap against the collar 38. The pipe coupling 34 may be threaded on an external thread of the end pipe cap 36 thereby rotatably attaching the rotary unit 16 to the handle 10 of the apparatus.

Figure 3:
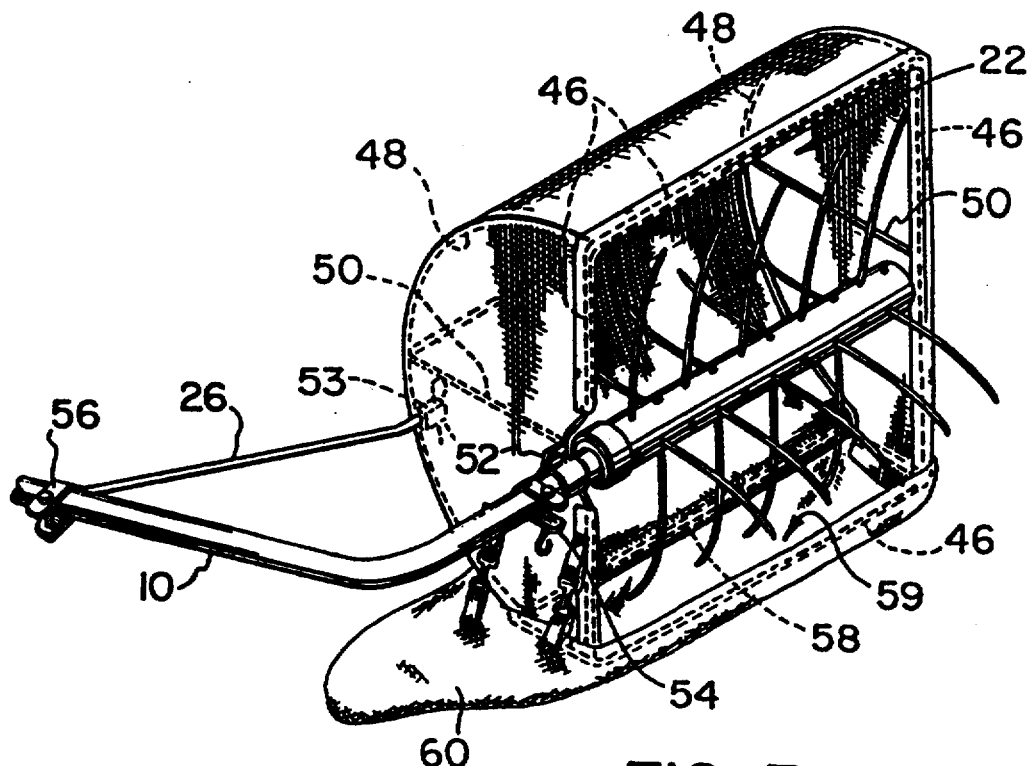
FIG. 3 shows a perspective view of the attachment means used for attaching the containment means to the handle.

Referring to FIG. 3, the containment element comprises a frame made of ¼ inch diameter steel rod. The frame has four members 46 joined at their corners to form a generally rectangular opening 22. Generally semi-circular members 48 are attached to the frame at the sides of the opening 22. Two bracing members 50 extend between the middle of two of the cross members 46 and the apex of the semi-circular members 48.

Connecting member 52 is connected to the bracing member 50 and cross member 46 which are adjacent the handle 10 when the containment member is attached thereto. The connecting member 52 is attached to the handle by means of a U-shaped connector 54. Additional bracing member 26 is releasably held in a socket 53 attached to the apex of a semi-circular member 48 by a cotter pin passed through a bore hole (not shown) in the member 26 and connected by a releasable U-shaped connector 56 to the handle 10.

A hand grip 28 may be attached directly to the handle 10 or may be attached to the brace 26. Preferably, the hand grip 28 is pivotally attached to the brace 26 so that it may be folded away for transportation.

A porous, tight weave, nylon mesh, which is sized to allow air, but not seed, to flow through it, is adapted to fit tightly over the containment element frame. A cross member 58 extends between the semi-circular members 48 spaced from one of the cross members 46. The nylon mesh does not cover the space 59 between the cross member 58 and the cross members 46. A close weave seed bag 60 is adapted to be removably affixed around the periphery of space 59 by an elasticized top thereof. The seed bag may alternatively be affixed to the hopper by means of clips or otherwise. The space 59 and seed bag 60 form a hopper portion of the containment element and are positioned at the bottom of the containment element when the apparatus is in operation. Typically, the seed bag will collect several pounds of seed before it must be emptied or replaced.

An air permeable mesh is preferred for covering the containment frame since such a material lessens the tendency of the containment element to act as a sail in high winds. Further, if the mesh is not air permeable, a vent must be provided in the containment element to allow air flow for effective seed collection. However, any type of cover material may be used, albeit with varying effectiveness. Further, the provision of a separate seed bag for the containment element is preferred but the frame cover can be adapted to form a pouch and may be provided with a zipper or other closure means to allow for unloading of seed when required.

In operation, the motor 12 is started which commences rotation of the unit 16. The apparatus is then held with the axis of rotation of the unit generally perpendicular to the general orientation of the plant stalks, so that the stripper elements which extend beyond the opening and air flow of the rotating unit whip the seeds off the plant but generally do not cut the stalk. Preferably the rotary unit 16 is rotated such that the stripper elements 24 are travelling upwardly when they contact the plants. Depending upon the type of rotary unit 16 utilized (i.e. filament line or non-flexible stripper elements) and the type of plant, the unit will either dislodge the seeds from the plant, or remove the seed head from the plant. In the latter case, the seed heads must be milled to extract the seeds by sieving or winnowing at a later time. The stripper elements will generally be spaced so as to allow stalks of the plants from which seed is being collected to pass between them without being damaged.

When seeds are swept or knocked from the plant, airflow created by rotation of the unit, entrains the seed into the hopper portion 60 of the containment means.

Used properly, the apparatus of the invention provides an efficient hand-held seed collecting apparatus. It provides improved rate of seed collection over the prior art, but still allows selective harvesting of individual plants. The invention provides a portable, efficient seed collecting apparatus. Due to its light weight (a typical embodiment weighing approximately 10 lbs.), it may be carried for extended periods around a user's neck and shoulders with the carrying strap 30. The apparatus is particularly adapted for low impact harvesting of seed from wild grasses and plants, including endangered species, since it is carried by hand, and is adapted to remove seed without unnecessarily removing seed heads or clippings from the plants.

Although the apparatus may be sold as a complete unit, clearly a conversion assembly comprising one or more interchangeable rotary brush-like units adapted to be removably mounted on the drive shaft of a conventional string trimmer for rotation therewith, and seed containment means attachable to the handle of the conventional string trimmer, may be sold to modify existing string trimmers into seed collectors of the invention.

It will be obvious to one skilled in the art that the above description relates to preferred embodiments of the invention, and that numerous modifications and alterations may be made to the invention without departing from the spirit and scope of the invention as defined in the appended claims.

The embodiments of the invention in which an exclusive property or privilege is claimed are defined as follows:

1. A hand-held seed collecting apparatus comprising:
   (a) a unitary hollow elongated handle adapted to be manually supported in operation;
   (b) a motor mounted on said handle;
   (c) a drive shaft operatively connected to said motor extending through and mounted for rotation in said handle;
   (d) a drive shaft connector element operatively connected to said drive shaft and extending through an open end of said handle;
   (e) an elongated rotary brush-like unit removably mounted on said drive shaft connector element for rotation therewith, the rotary brush-like unit extending outwardly from said open end and having a longitudinal axis and axis of rotation generally perpendicular to said open end, said rotary brush-like unit having a plurality of seed stripper elements extending radially outwardly therefrom and operatively spaced around its periphery and along it s longitudinal axis; and (f) seed containment means mounted on said handle and extending outwardly from said open end adjacent said rotary brush-like unit.

2. A seed collecting apparatus according to claim 1 including manual gripping means mounted and arranged on said seed collecting apparatus to facilitate and arranged to facilitate manual support and operation of said seed collecting apparatus with said axis of rotation of said rotary brush-like unit being maintained generally horizontal.

3. A seed collecting apparatus according to claim 2 wherein:

(a) said seed containment means include a frame mounted on said elongated handle and supported with said rotary brush-like unit centred in an opening in said containment means;

(b) a brace member is connected between said elongated handle and said frame; and (c) said manual gripping means include a hand grip mounted on said brace.

4. A seed collecting apparatus according to claim 1 wherein said rotary brush-like unit comprises an elongated tube having apertures spaced around its periphery and along its length, and wherein said seed stripper elements each comprise a mono-filament line having a knot tied in an end which is operatively engaged with one of said apertures and a free end extending through one of said apertures outwardly from the elongated tube.

5. A seed collecting apparatus according to claim 1 wherein said rotary brush-like unit comprises an elongated tube and said seed stripper elements each comprise a non-flexible elongate member which extends transversely through the tube, engaging in apertures in the periphery thereof, and having at least one free end extending radially outwardly of the tube.

* * * * *